United States Patent
Monga et al.

(10) Patent No.: US 8,139,857 B2
(45) Date of Patent: Mar. 20, 2012

(54) LOCAL REGRESSION METHODS AND SYSTEMS FOR IMAGE PROCESSING SYSTEMS

(75) Inventors: Vishal Monga, Webster, NY (US); Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 509 days.

(21) Appl. No.: 12/406,303

(22) Filed: Mar. 18, 2009

(65) Prior Publication Data
US 2010/0239162 A1   Sep. 23, 2010

(51) Int. Cl.
*G06K 9/00* (2006.01)
(52) U.S. Cl. ......................... 382/167; 382/162
(58) Field of Classification Search .................. 382/162, 382/167; 345/207, 204; 347/19, 115, 172; 358/1.9, 518, 529; 356/326, 319, 300
See application file for complete search history.

(56) References Cited

U.S. PATENT DOCUMENTS

| 5,649,073 A | 7/1997 | Knox et al. |
| 5,781,206 A * | 7/1998 | Edge ............................. 347/19 |
| 6,654,143 B1 | 11/2003 | Dalal et al. |
| 7,710,560 B2 * | 5/2010 | Holub ........................ 356/300 |
| 2002/0029715 A1 | 3/2002 | Ogatsu et al. |
| 2007/0139734 A1 | 6/2007 | Fan et al. |

OTHER PUBLICATIONS

R. Bala "Device Characterization", Digital Color Imaging Handbook, Chapter 5. CRC Press, 2003.

* cited by examiner

*Primary Examiner* — Anh Hong Do
(74) *Attorney, Agent, or Firm* — Fay Sharpe LLP (57) ABSTRACT

This disclosure provides methods, apparatus and systems for performing image processing regression for approximating multidimensional color transformation. According to an exemplary method, a shaping matrix is selected to minimize a cost function associated with a local linear regression representation of the color transformation.

20 Claims, 5 Drawing Sheets

LOCAL REGRESSION METHODS AND SYSTEMS FOR IMAGE PROCESSING SYSTEMS

BACKGROUND

Local linear regression is used in a variety of data fitting applications. Particular applications within the realm of color imaging include printer and scanner characterization. A typical regression problem involves first gathering a training set of input data points from an input space and corresponding output data points from an output space. For the color characterization application, both input and output spaces are multi-dimensional color spaces. The goal of the regression algorithm is then to derive mappings from every point in the input space to the output space while minimizing error over the training set. An additional consideration is to ensure that the regression does not overfit the data in the sense that it is robust to noise in the training data. Local regression algorithms are often used in situations where a single global fit may be inadequate to approximate complex non-linear transforms, as is typical in printer characterization. Instead, local transforms are derived where the regression parameters vary as a function of the input data point. Locality in regression is achieved by using a weighting in the error minimization function which varies (typically decays) as a function of the distance from the regression data point. Choice of these weight functions is typically intuitively inspired, and not optimized for the training set. This sometimes results in large regression errors especially with sparse training data. A key fundamental question hence remains on how to best use a certain local neighborhood of data points in regression problems.

INCORPORATION BY REFERENCE

R. Bala, "Device Characterization", *Digital Color Imaging Handbook*, Chapter 5, CRC Press, 2003, is totally incorporated herein by reference in its entirety.

BRIEF DESCRIPTION

In one embodiment of this disclosure, a regression method for approximating a multidimensional color transformation is disclosed which comprises (a) receiving a set $\Gamma$ of training samples $(x_i, y_i)$, $1 \leq i \leq T$, where $x_i$ represents input color data to the multidimensional color transformation, and $y_i$ represents corresponding output color data from the multidimensional color transformation; (b) selecting a parameterized form of a regression function f(x) that approximates the multidimensional color transformation; (c) receiving an input color x; (d) generating a cost function C representing a localized error produced by the regression function f(x) on the training set $\Gamma$, where the localized error is a function of both the parameters of f(x) and a shaping function that defines the shape and orientation of a neighborhood of training data localized around the input color x; (e) deriving the parameters of the regression function f(x) and shaping function to jointly minimize the cost function C; and (f) generating an output color y by calculating f(x) using the derived parameters of step (e).

In another aspect of this disclosure, a computer program product, that when executed by a computer, causes the computer to execute a regression method for approximating a multidimensional color transformation is described. The method comprises (a) receiving a set $\Gamma$ of training samples $(x_i, y_i)$, $1 \leq i \leq T$, where $x_i$ represents input color data to the multidimensional color transformation, and $y_i$ represents corresponding output color data from the multidimensional color transformation; (b) selecting a parameterized form of a regression function f(x) that approximates the multidimensional color transformation; (c) receiving an input color x; (d) generating a cost function C representing a localized error produced by the regression function f(x) on the training set $\Gamma$, where the localized error is a function of both the parameters of f(x) and a shaping function that defines the shape and orientation of a neighborhood of training data localized around the input color x; (e) deriving the parameters of the regression function f(x) and shaping function to jointly minimize the cost function C; and (f) generating an output color y by calculating f(x) using the derived parameters of step (e).

In still another aspect of this embodiment, an image processing method is disclosed for rendering an image on an image output device. The method comprises receiving a device independent color space representation of the image; accessing an inverse characterization transform associated with the image output device to generate a device dependent color space representation of the image, the inverse characterization transform representing the inverse of a multidimensional color transformation associating a plurality of device dependent color space values with a plurality of respective device independent color space values, the multidimensional color transformation generated by performing a method comprising: (a) receiving a set $\Gamma$ of training samples $(x_i, y_i)$, $1 \leq i \leq T$, where $x_i$ represents input color data to the multidimensional color transformation, and $y_i$ represents corresponding output color data from the multidimensional color transformation; (b) selecting a parameterized form of a regression function f(x) that approximates the multidimensional color transformation; (c) receiving an input color x; (d) generating a cost function C representing a localized error produced by the regression function f(x) on the training set $\Gamma$, where the localized error is a function of both the parameters of f(x) and a shaping function that defines the shape and orientation of a neighborhood of training data localized around the input color x; (e) deriving the parameters of the regression function f(x) and shaping function to jointly minimize the cost function C; and (f) generating an output color y by calculating f(x) using the derived parameters of step (e).

In yet another aspect of this embodiment, a computer program product is disclosed that when executed by a computer, causes the computer to perform a color transformation for rendering an image on an image output device. The method of deriving the color transformation comprises (a) receiving a set $\Gamma$ of training samples $(x_i, y_i)$, $1 \leq i \leq T$, where $x_i$ represents input color data to the multidimensional color transformation, and $y_i$ represents corresponding output color data from the multidimensional color transformation; (b) selecting a parameterized form of a regression function f(x) that approximates the multidimensional color transformation; (c) receiving an input color x; (d) generating a cost function C representing a localized error produced by the regression function f(x) on the training set $\Gamma$, where the localized error is a function of both the parameters of f(x) and a shaping function that defines the shape and orientation of a neighborhood of training data localized around the input color x; (e) deriving the parameters of the regression function f(x) and shaping function to jointly minimize the cost function C; and (f) generating an output color y by calculating f(x) using the derived parameters of step (e).

DETAILED DESCRIPTION

This disclosure provides methods and systems for local regression in deriving color transformations by introducing the notion of "shaping" in the localizing weight function. The disclosed exemplary embodiments include distinct features: 1.) a parameterization of the weight function typically used in local regression problems via a shaping matrix, and 2.) a method to obtain the "optimal" shaping matrix by explicitly introducing the weight function parameters in the regression error measure. Demonstrated experimentally are that significant gains can be made by optimizing "the shaping matrix" in local regression problems. Many color imaging applications including printer and scanner characterization can benefit from the disclosed methods, apparatus and systems. The disclosed exemplary embodiments are particularly advantageous for color devices that employ a large number of color channels, thus inducing a large dimensionality in the characterization data.

Regression is a common technique for estimating a functional relationship between input and output data, and is used frequently to derive color device characterization transformations. The latter typically establish a functional relationship between a device dependent color space and a device independent color space. For printers, examples of device dependent color spaces include CMY, CMYK or CMYKOV, where the symbols stand for Cyan, Magenta, Yellow, Black, Orange, Violet, respectively. For display devices, the prevalent device dependent color space is RGB (or Red, Green, Blue). A common example of a device independent color space is CIELAB. There are two types of color characterization transforms—a forward and an inverse. For output devices, the forward transform maps a device dependent color space to a device independent color space, and conversely, the inverse transform maps a device independent color space to a device dependent color space. In certain applications, the forward transform for one device is concatenated with the inverse transform for another device to produce a "device-to-device" color transformation. The regression techniques and exemplary embodiments described herein can be applied to forward, inverse, or device-to-device characterization transforms.

Linear regression is a specific case where the functional relationship between the input and output spaces is approximated by a linear transform. When the input and output data belong to multidimensional vector spaces, the linear transform is a matrix. Specifically, consider the problem where y in $R^m$ is to be estimated as a function of an input variable x in $R^n$. Thus we have $y \approx f(x)$. Let $\Gamma = \{(x_i, y_i), i=1, 2, \ldots, T\}$ denote the set of training data over which this response in known. The linear approximation is given by:

$$y=f(x)=A.x,\ x \in R^n,\ y \in R^m,\ A \in R^{m \times n} \qquad (1)$$

The "best" regression parameter A is determined by minimizing the regression cost function that describes an aggregate error between $y_i$ and $Ax_i$ for the training set.

A variant of this is local linear regression as described in R. Bala, "Device Characterization," Digital Color Imaging Handbook, Chapter 5. CRC Press, 2003, wherein the matrix A varies as a function of location x in input space. Thus we have $$y=f(x)=A_x.x,\ x \in R^n,\ y \in R^m,\ A \in R^{m \times n} \qquad (2)$$

For each input data point x, the "best" regression parameter $A_x$ is determined by minimizing the regression cost function:

$$C(A_x) = \frac{1}{T}\sum_{i=1}^{T} \|y_i - A_x \cdot x_i\|^2 \cdot w(x, x_i) \qquad (3)$$

In the above cost function, note that it is the presence of weight function $w(x, x_i)$ that introduces locality in regression.

The most general requirement is for $w(x, x_i)$ to decay as a function of the distance $d(x, x_i) = \|x-x_i\|$. A popular instantiation is:

$$w(x,x_i)=e^{-\alpha(\|x-x_i\|^2)} \qquad (4)$$

Figure 2:
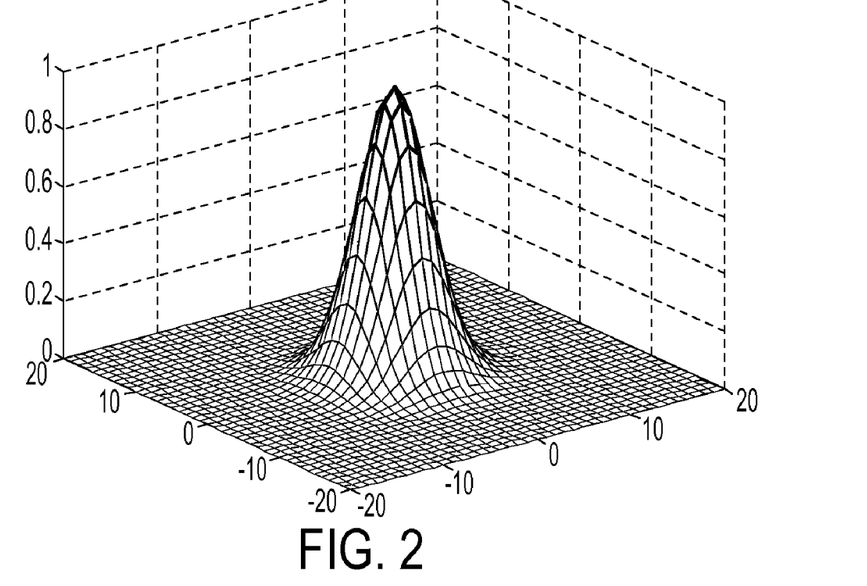
FIG. 2 is a plot of weight functions $w(x, x_0)$ for $x_0=(0,0)$, where the weight function decays as a function of distance from $x_0$ to generate a neighborhood around $x_0$.

The above weight function is plotted in FIG. 2 for a 2-D input variable x. Clearly, there is decay as a function of distance from input point x which means that in the cost function of Equation (3), more weight is attached to regression sets for which $d(x, x_i)$ is small. Qualitatively, the subset of $\{x_i\}$'s for which $w(x, x_i)$ is greater than a threshold (so as to have a significant impact on the cost function) constitutes a local neighborhood of x.

Limitations of existing local linear regression is now discussed.

The use of such locality inducing weight functions is well-known to significantly help with regression accuracy over using a single "global" regression. The same has also been successfully applied to derive both forward and inverse printer color transforms in R. Bala, "Device Characterization", Digital Color Imaging Handbook, Chapter 5, CRC Press, 2003.

The notion of locality as in Equation (4) is meaningful from the viewpoint of neighborhood size, i.e. a certain a may be chosen to control the spread of $w(x, x_i)$ around x. That said, an important consideration that was previously ignored is shaping of $w(x, x_i)$.

Figure 3:
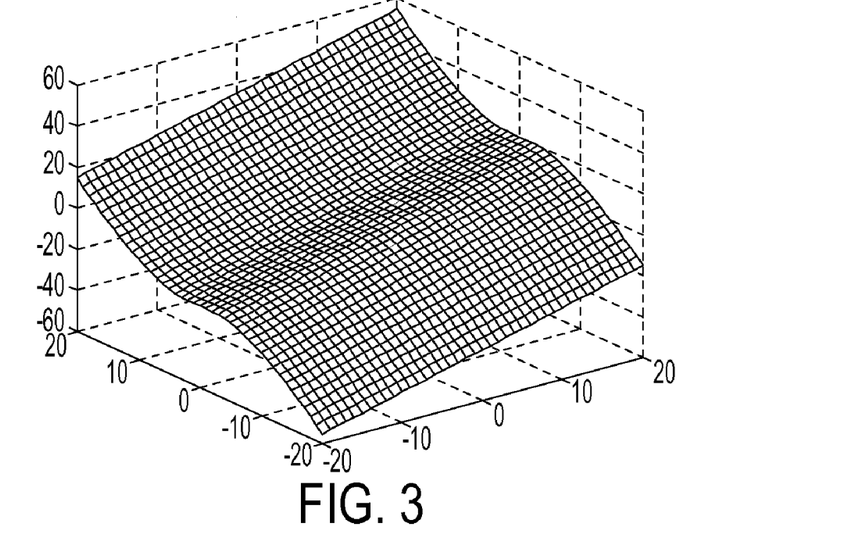
FIG. 3 illustrates one exemplary function mapping from 2-D space ($R^2$) to 1-D space (R) to be approximated according to an exemplary regression method according to this disclosure.
Figure 4:
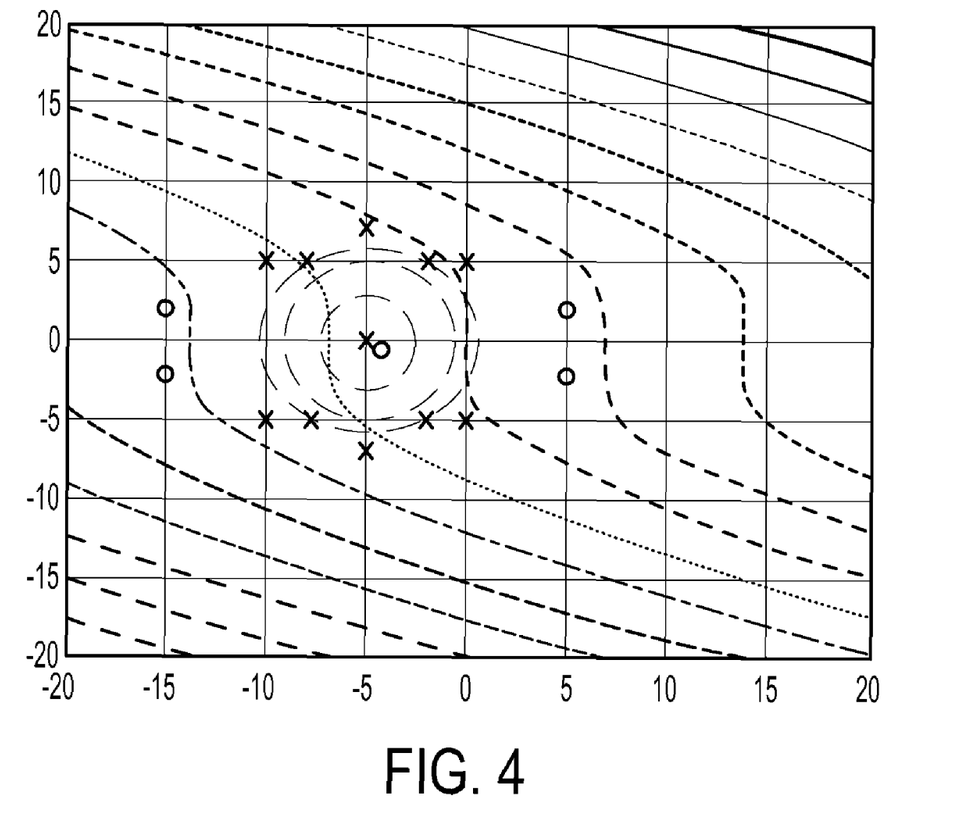
FIG. 4 illustrates the contours of the function illustrated in FIG. 3 with exemplary training data overlaid.

To appreciate this, consider, the 2-D function plotted in FIG. 3. FIG. 4 shows contours of this function with training data overlaid. It is desired to approximate this 2-D function with a locally linear regression function f( ), and to compute the regression output for the input point labeled "x".

It may be seen from FIG. 4 that many different regression neighborhoods may be defined in the vicinity of the input point. A few such circular neighborhoods are shown in FIG. 4. Note also that circles centered at a point $x_0$ are contours of the distance function $d(x, x_0) = \|x-x_0\|$.

From a visual inspection of the plot in FIG. 3 it is clear that the original 2-D function is simply linear in the vicinity of the input point x, and can hence be perfectly approximated. But for that to happen, the regression must pick or attach greater weight to training data in the "linear region" vs. training data points in the non-linear region. Note further that for the three different circular neighborhoods shown in FIG. 4 the training data points identified as "x"s are closer to the input point, and will in fact get more weight, regardless of the size (radius) of the circular neighborhoods.

Detailed next is how this problem may be averted by introducing the notion of "neighborhood shaping."

In this disclosure, utilized are the use of neighborhood shaping to address the problem discussed above. That is, the crucial observation is made that for a fixed neighborhood size, shaping plays an important role in regression accuracy.

Described now is how to achieve a desired neighborhood shaping. It is observed that for finite-dimensional input spaces, the distance function $d(x, x_i)=\|x-x_i\|$ can alternatively be written as $$\|x-x_i\|^2 = (x-x_i)^T(x-x_i)$$

As shown in FIG. 4, contours of such a distance function result in hyper-spheres in $R^n$ (special case circle in $R^2$).

Proposed first is a generalization of this distance to:

$$\|x-x_i\|_\Lambda = (x-x_i)^T \Lambda (x-x_i)$$

where $\Lambda$ is a positive definite matrix, which is a requirement to ensure non-negativity of the distance metric for all $x, x_0$.

It is clear now that the contours of this new distance can be generalized to be elliptical. A diagonal $\Lambda$ with positive unequal diagonal entries results in a hyper-ellipse with different ellipse radii in different dimensions, while non-diagonal choices of $\Lambda$ allow the control of orientation.

Notably, the local linear transform $A_x$ and the resulting output estimates may vary considerably with different choices of $\Lambda$. One possible strategy to optimize $\Lambda$ is to make it proportional to the sample covariance matrix of the training data.

This disclosure and the exemplary embodiments described herein provide methods to find the best "shape" of the weight function or equivalently $\Lambda$ for a fixed size/volume. To formally distinguish shape from size, we re-write $\Lambda$ as follows:

$$\Lambda = \lambda S^T S; \Lambda, S \in R^{n \times n},$$

where S denotes a "shape matrix" with determinant 1, and $\lambda$ is a non-negative scalar relating to the size of the local neighborhood.

Given this separation of size and shape the shaping matrix may be solved for optimally by minimizing the regression error:

$$C(A_x, \Lambda) = \frac{1}{T} \sum_{i=1}^{T} \|y_i - A_x \cdot x_i\|^2 \cdot w(x, x_i) \quad (5)$$

where $w(x, x_i) = e^{-(x-x_i)^T \Lambda (x-x_i)}$
subject to $\det(\Lambda) = c$
c=positive constant Salient features of the optimization problem in Equation (5) are that (i) in this new setting, $\Lambda$ or really the shape matrix S as well as the regression parameter matrix $A_x$ are jointly optimized; and (ii) the constraint c placed on the determinant of $\Lambda$ fixes the size of the neighborhood.

Standard search-based constrained optimization techniques with a suitable choice of a starting point, can be used to determine the optimum S and $A_x$.

Note finally that although the embodiment and examples have been described for linear regression, in principle the same technique readily extends for nonlinear regression. The elements of the matrix A would be simply replaced by the parameters of the nonlinear approximation function.

Figure 5:
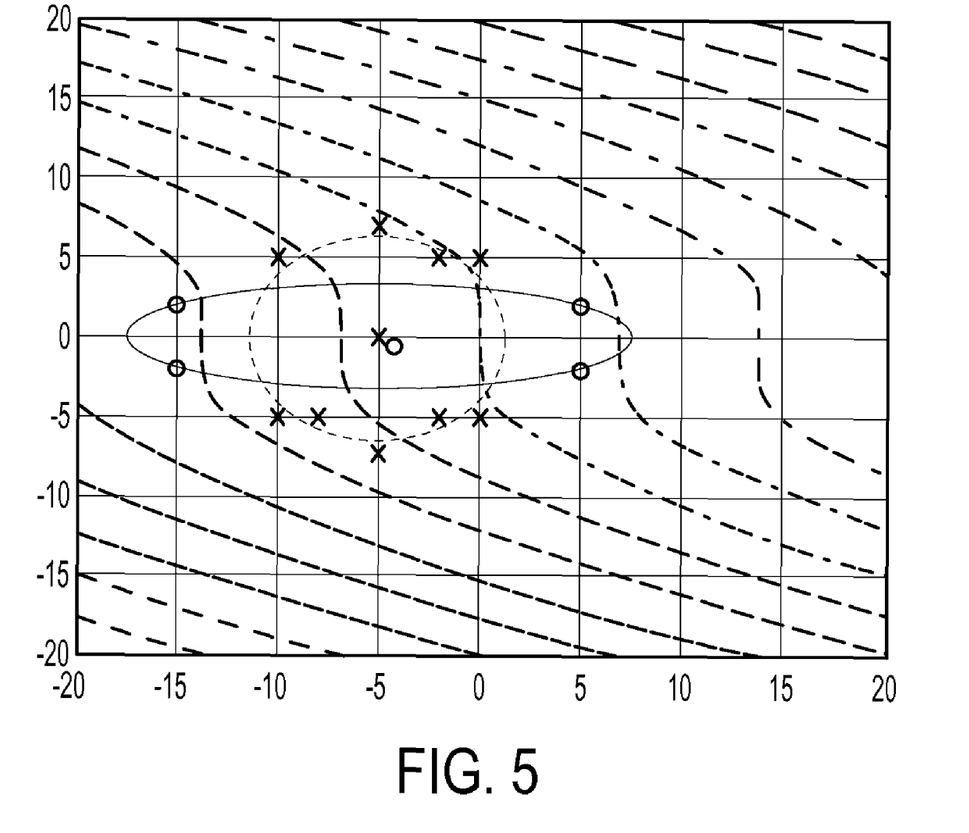
FIG. 5 illustrates local regression using neighborhood shaping according to an exemplary embodiment of this disclosure.

Revisiting the regression problem in FIG. 3, the training data was fed to both classical local linear regression as well as to the proposed regression with neighborhood shaping. FIG. 5 visualizes the results. In both cases, for the same neighborhood size (appropriately parameterized in either cost function) contours of the distance function are overlaid on the regression data. Clearly, in the proposed case, regression data points in the "linear region" afford more weight and hence the regression succeeds in perfectly approximating the function.

Figure 1:
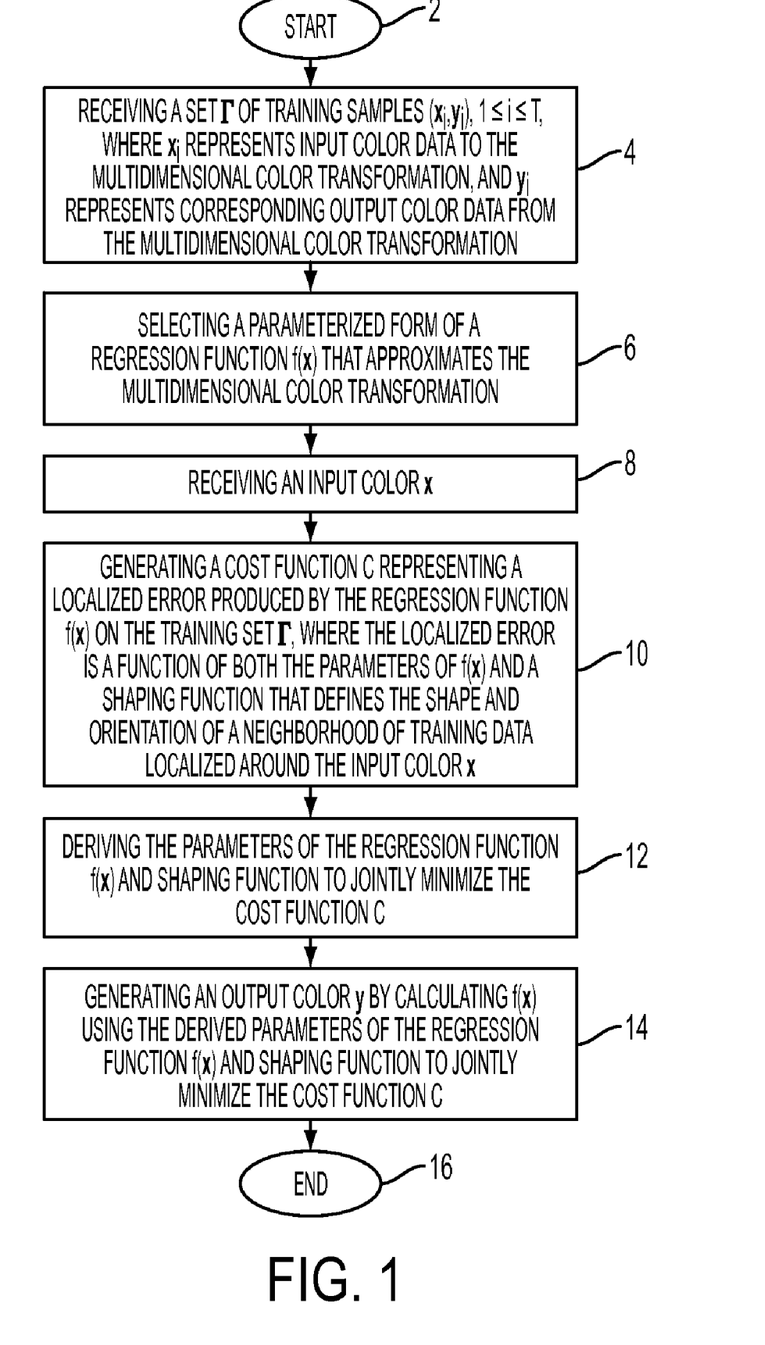
FIG. 1 is a flow chart of an exemplary image processing regression method according to this disclosure.

With reference to FIG. 1, illustrated is a flow chart of an exemplary image processing regression method incorporating neighborhood shaping as discussed hereto. By way of example, the method will be described with particular reference to a printing system, however the image processing method is not limited to printing and can be applied to image processing in general.

In the context of a printing system, the image processing regression method illustrated in FIG. 1 generates a multidimensional color transformation associating a plurality of device dependent color space values with a plurality of respective device independent color space values.

To print a particular image, the inverse of the color transformation generated by the method of FIG. 1 is accessed to transform an image represented in device independent color space to device, i.e. printer, dependent color space for rendering/printing on the printer. As previously discussed, the device dependent color space representations of the image, numerically indicate a relative amount of their corresponding printer colors, e.g. CMYK, necessary to print the original image represented in device independent color space.

To generate the printer characterization transform, computer readable instructions are executed in the following sequence:

Initially, the printer multidimensional color characterization transform generation algorithm starts 2.

Next, receiving a set $\Gamma$ of training samples $(x_i, y_i)$, $1 \leq i \leq T$, is received where $x_i$ represents input color data to the multidimensional color transformation, and $y_i$ represents corresponding output color data from the multidimensional color transformation 4.

Next, a parameterized form of a regression function $f(x)$ that approximates the multidimensional color transformation is selected 6.

Next, an input color x is received 8.

Next, a cost function C representing a localized error produced by the regression function $f(x)$ on the training set $\Gamma$ is generated 10, where the localized error is a function of both the parameters of $f(x)$ and a shaping function that defines the shape and orientation of a neighborhood of training data localized around the input color x.

Next, the parameters of the regression function $f(x)$ and shaping function to jointly minimize the cost function C are derived 12.

Next, an output color y is generated 14 by calculating $f(x)$ using the derived parameters of the regression function $f(x)$ and shaping function to jointly minimize the cost function C.

Finally, the printer multidimensional color characterization transform generation algorithm ends 16.

Figure 6:
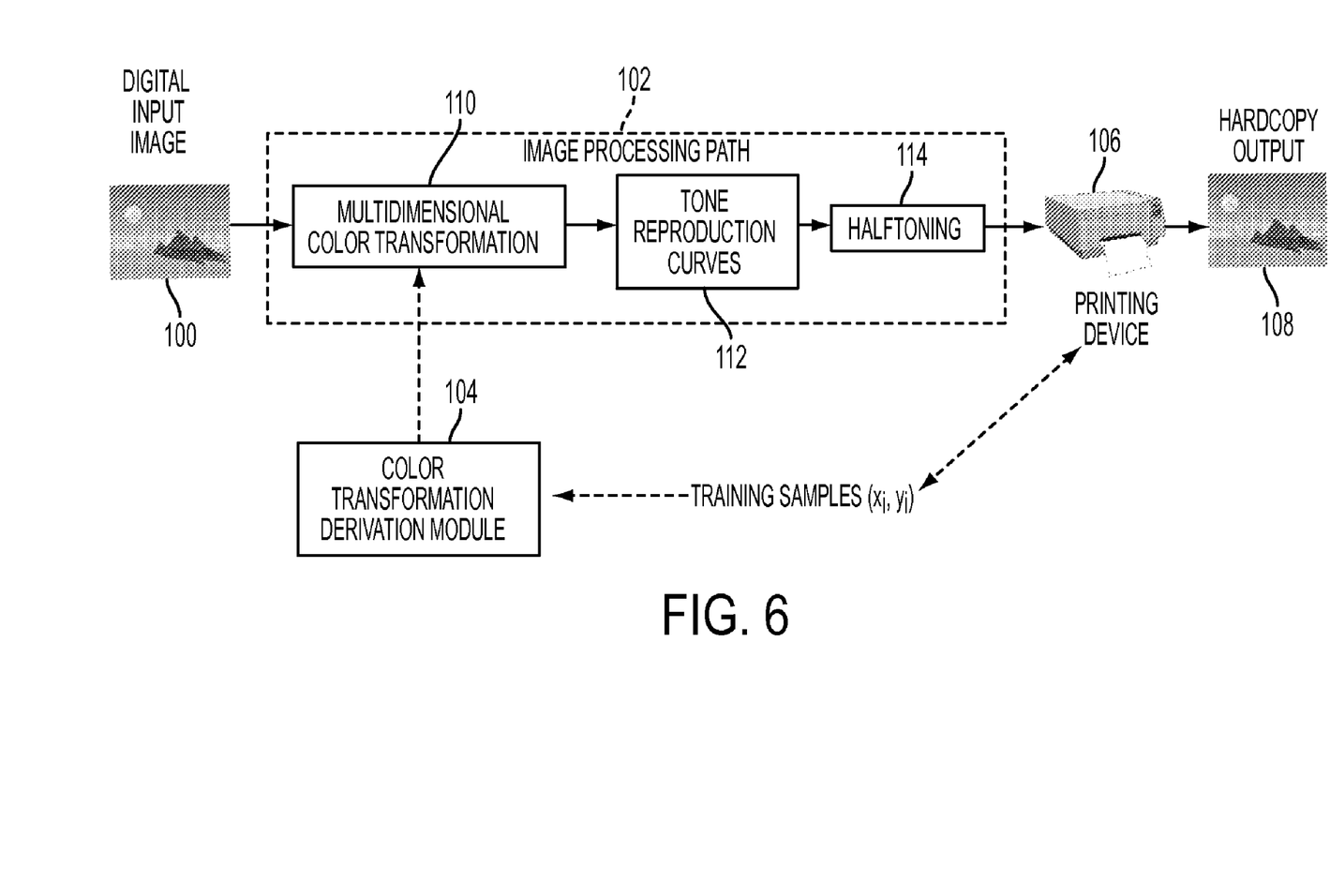
FIG. 6 is a block diagram of an image processing system using an exemplary regression method according to this disclosure.

With reference to FIG. 6, illustrated is a black diagram of an image processing system using an exemplary regression method as discussed hereto and described with reference to FIG. 6.

In operation, the printing system receives a digital input 100, represented in device independent color space, and processes 102 the device independent color space representation of the digital input image 100 to generate a pixel representation of the digital input image suitable for printing on printing device 106 to generate a hardcopy output 108 of the digital input image 100.

The image processing path 102 can reside and be executed on a DFE (Digital Front End), and/or the printing device 106. However, as will be understood by those of skill in the art, any computer related device capable of executing instructions can be used to process the image data.

As shown in FIG. 6, the image processing path includes a multidimensional color transformation, e.g. a look-up-table, which incorporates data generated by the color transformation derivation module to produce device dependent color space representations of the digital input image. Notably, the color transformation derivation module approximates a multidimensional color transformation according to the methods described in this disclosure and specifically illustrated in FIG. 5.

After the digital input image is processed by the multidimensional color transformation module to produce device dependent color space representations of the digital input image, the image data is processed according to specific tone reproduction curves 112 and halftoning algorithms 114 to generate pixel data to be rendered on the printing device 106.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A regression method for approximating a multidimensional color transformation associated with an image output device, the regression method executed by a controller operatively connected to the image output device, and the method comprising:
   (a) receiving a set $\Gamma$ of training samples $(x_i, y_i)$, $1 \leq i \leq T$, where $x_i$ represents input color data to the multidimensional color transformation, and $y_i$ represents corresponding output color data from the multidimensional color transformation;
   (b) selecting a parameterized form of a regression function $f(x)$ that approximates the multidimensional color transformation;
   (c) receiving an input color x;
   (d) generating a cost function C representing a localized error produced by the regression function $f(x)$ on the training set $\Gamma$, where the localized error is a function of both the parameters of $f(x)$ and a shaping function that defines the shape and orientation of a neighborhood of training data localized around the input color x;
   (e) deriving the parameters of the regression function $f(x)$ and shaping function to jointly minimize the cost function C; and
   (f) generating an output color y by calculating $f(x)$ using the derived parameters of step (e).

2. The method according to claim 1, wherein the shaping function in step (d) is a shaping matrix S.

3. The method according to claim 2, wherein the regression function in step (b) is a local linear regression function represented as $$y = f(x) = A_x x, \; x \in R^n, \; y \in R^m, \; A \in R^{m \times n}.$$

4. The method according to claim 3, wherein the cost function C in step (d) is defined as $$C = C(A_x, \Lambda) = \frac{1}{T} \sum_{i=1}^{T} \|y_i - A_x \cdot x_i\|^2 \cdot w(x, x_i),$$

where $w(x, x_i) = e^{-(x-x_i)^T \Lambda (x-x_i)}$, $\Lambda = \lambda S^T S$, s is a shaping matrix, and the minimization of C is subject to the constraint that the determinant of $\Lambda = c$, where c is a positive constant.

5. The method of claim 1, wherein the multidimensional color transformation is a mapping from a device dependent color space to a device independent color space.

6. A computer program product, that when executed by a computer, causes the computer to execute a regression method for approximating a multidimensional color transformation, the method comprising:
   (a) receiving a set $\Gamma$ of training samples $(x_i, y_i)$, $1 \leq i \leq T$, where $x_i$ represents input color data to the multidimensional color transformation, and $y_i$ represents corresponding output color data from the multidimensional color transformation;
   (b) selecting a parameterized form of a regression function $f(x)$ that approximates the multidimensional color transformation;
   (c) receiving an input color x;
   (d) generating a cost function C representing a localized error produced by the regression function $f(x)$ on the training set $\Gamma$, where the localized error is a function of both the parameters of $f(x)$ and a shaping function that defines the shape and orientation of a neighborhood of training data localized around the input color x;
   (e) deriving the parameters of the regression function $f(x)$ and shaping function to jointly minimize the cost function C; and
   (f) generating an output color y by calculating $f(x)$ using the derived parameters of step (e).

7. The computer program product according to claim 6, wherein the shaping function in step (d) is a shaping matrix S.

8. The computer program product according to claim 7, the regression function in step (b) is a local linear regression function represented as $$y = f(x) = A_x x, \; x \in R^n, \; y \in R^m, \; A \in R^{m \times n}.$$

9. The computer program product according to claim 8, wherein the cost function C in step (d) is defined as $$C = C(A_x, \Lambda) = \frac{1}{T} \sum_{i=1}^{T} \|y_i - A_x \cdot x_i\|^2 \cdot w(x, x_i),$$

where $w(x, x_i) = e^{-(x-x_i)^T \Lambda (x-x_i)}$ $\Lambda = \lambda S^T S$, S is a shaping matrix, and the minimization of C is subject to the constraint that the determinant of $\Lambda = c$, where c is a positive constant.

10. The computer program product according to claim 6, wherein the multidimensional color transformation is a mapping from a device dependent color space to a device independent color space.

11. An image processing method for rendering an image on an image output device, the image processing method executed by a controller operatively connected to the image output device, and the method comprising:
   receiving a device independent color space representation of the image;
   accessing an inverse characterization transform associated with the image output device to generate a device dependent color space representation of the image, the inverse characterization transform representing the inverse of a multidimensional color transformation associating a plurality of device dependent color space values with a plurality of respective device independent color space values, the multidimensional color transformation generated by performing a method comprising:
   (a) receiving a set $\Gamma$ of training samples $(x_i, y_i)$, $1 \leq i \leq T$, where $x_i$ represents input color data to the multidimensional color transformation, and $y_i$ represents corresponding output color data from the multidimensional color transformation;

(b) selecting a parameterized form of a regression function f(x) that approximates the multidimensional color transformation;

(c) receiving an input color x;

(d) generating a cost function C representing a localized error produced by the regression function f(x) on the training set Γ, where the localized error is a function of both the parameters of f(x) and a shaping function that defines the shape and orientation of a neighborhood of training data localized around the input color x;

(e) deriving the parameters of the regression function f(x) and shaping function to jointly minimize the cost function C; and (f) generating an output color y by calculating f(x) using the derived parameters of step (e).

12. The image processing method according to claim 11, wherein the shaping function in step (d) is a shaping matrix S.

13. The image processing method according to claim 12, wherein the regression function in step (b) is a local linear regression function represented as $$y=f(x)=A_x \cdot x, x \in R^n, y \in R^m, A \in R^{m \times n}.$$

14. The image processing method according to claim 13, wherein the cost function C in step (d) is defined as $$C = C(A_x, \Lambda) = \frac{1}{T} \sum_{i=1}^{T} \|y_i - A_x \cdot x_i\|^2 \cdot w(x, x_i),$$

where $w(x, x_i) = e^{-(x-x_i)^T \Lambda (x-x_i)}$, $\Lambda = \lambda S^T S$, S is a shaping matrix, and the minimization of C is subject to the constraint that the determinant of $\Lambda = c$, where c is a positive constant.

15. The image processing method according to claim 11, wherein the multidimensional color transformation is a mapping from a device dependent color space to a device independent color space.

16. A computer program product that when executed by a computer, causes the computer to perform a color transformation for rendering an image on an image output device, the method of deriving the color transformation comprising:

(a) receiving a set Γ of training samples $(x_i, y_i)$, $1 \leq i \leq T$, where $x_i$ represents input color data to the multidimensional color transformation, and $y_i$ represents corresponding output color data from the multidimensional color transformation;

(b) selecting a parameterized form of a regression function f(x) that approximates the multidimensional color transformation;

(c) receiving an input color x;

(d) generating a cost function C representing a localized error produced by the regression function f(x) on the training set Γ, where the localized error is a function of both the parameters of f(x) and a shaping function that defines the shape and orientation of a neighborhood of training data localized around the input color x;

(e) deriving the parameters of the regression function f(x) and shaping function to jointly minimize the cost function C; and (f) generating an output color y by calculating f(x) using the derived parameters of step (e).

17. The computer program product according to claim 16, wherein the shaping function in step (d) is a shaping matrix S.

18. The computer program product according to claim 17, wherein the regression function in step (b) is a local linear regression function represented as $$y=f(x)=A_x \cdot x, x \in R^n, y \in R^m, A \in R^{m \times n}.$$

19. The computer program product according to claim 18, wherein the cost function C in step (d) is defined as $$C = C(A_x, \Lambda) = \frac{1}{T} \sum_{i=1}^{T} \|y_i - A_x \cdot x_i\|^2 \cdot w(x, x_i),$$

where $w(x, x_i) = e^{-(x-x_i)^T \Lambda (x-x_i)}$, $\Lambda = \lambda S^T S$, S is a shaping matrix, and the minimization of C is subject to the constraint that the determinant of $\Lambda = c$, where c is a positive constant.

20. The computer program product according to claim 19, wherein the multidimensional color transformation is a mapping from a device dependent color space to a device independent color space.

* * * * *